Figure 1:
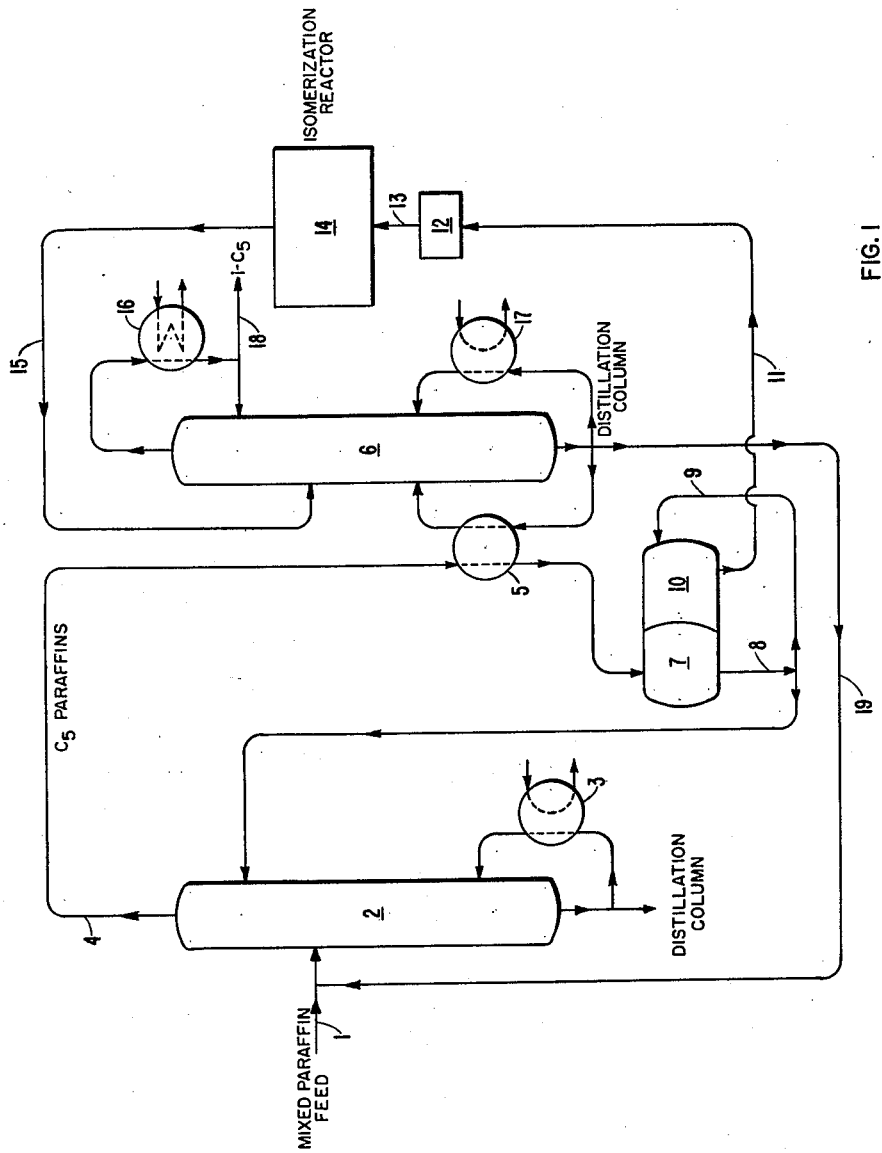

3,192,284
ISOMERIZATION PROCESS
Dirk Kanbier, The Hague, Netherlands, assignor to Shell Oil Company, New York, N.Y., a corporation of Delaware
Filed Dec. 3, 1962, Ser. No. 241,827
1 Claim. (Cl. 260—683.73)

The invention relates to a process for the preparation of a hydrocarbon product consisting at least substantially of $C_4$- or $C_5$-isoparaffins. "$C_4$ or $C_5$" will hereinafter be referred to as "$C_n$," where $n$ may have the value 4 or 5.

Processes such as this, whereby it is possible with the aid of isomerization treatments to prepare isoparaffin-rich fractions suitable, for example, as feedstock for an alkylation process or for recovering the isoparaffins therefrom in a (substantially) pure state, were already known. The starting material (often a straight-run petroleum fraction) is substantially freed of isoparaffins in order to avoid unnecessary loading of the apparatus in which the isomerization treatment itself takes place.

It has now been found that when applying a certain type of isomerization treatment such a drastic removal of isoparaffins is superfluous; on the contrary, if this removal step is omitted, an economically highly attractive process is obtained, provided that the preparation of a relatively isoparaffin-rich material to be subjected to such an isomerization treatment is coupled with the working up of the isomerization product obtained during the isomerization treatment itself.

The process according to the invention thus consists in preparing a starting material containing $C_n$-hydrocarbons, a material consisting at least substantially of $C_n$-paraffins and having a $C_n$-isoparaffin content of at least 15% by weight, based on the total $C_n$-paraffin content, subjecting said material to an isomerization treatment such that the $C_n$-isoparaffin content in the isomerization product, based on the total $C_n$-paraffin content thereof, amounts to at least 55% by weight (in case of $C_4$-(iso-)paraffins) or at least 60% by weight (in case of $C_5$-(iso-)paraffins), whereafter the $C_n$-isoparaffins are at least substantially separated from the isomerization product and the remainder of the isomerization product is at least in part resubjected to the isomerization treatment.

In addition to $C_n$-paraffins, the material to be subjected to the isomerization treatment may alternatively also have a small content of light olefins and/or naphthenes or also of somewhat heavier components. However, the total content of such components is small. A certain naphthalene content (in particular cyclopentane in the preparation of $C_5$-isoparaffins) is an advantage during the isomerization treatment since it reduces the incidence of undesirable side reactions.

The material which contains a certain amount of isoparaffins and is to be subjected to the isomerization treatment may, for example, be prepared by subjecting the starting material to a separation process (for example by distillation, adsorption or such like) in one or more steps, this material then being obtained, for example, as a top or bottom product, side stream or such like.

Similarly, $C_4$- or $C_5$-isoparaffins may also be separated from the isomerization product in any desired fashion, the remainder of the isomerization product being recovered as one or more fractions. These fractions or a quantity thereof are either immediately resubjected to the isomerization treatment or subjected again to separation, whereupon one or more of the separation products is in whole or in part recycled to the isomerization step. It is also possible to effect the separation of isoparaffins after the isomerization product has already been divided into a number of fractions; the fraction(s) which is(are) free from $C_n$-isoparaffins and/or especially the remainder of the fraction(s) from which these isoparaffins have been separated are(is) then wholly or in part resubjected to the isomerization treatment.

Preferably, the material to be subjected to the isomerization treatment is prepared as, or from, the top product produced during fractional distillation of the starting material, the isomerization product or a part thereof is separated by fractional distillation into a top product consisting at least substantially of $C_n$-isoparaffins and a bottom product, and this bottom product is at least partially recycled to the distillation zone for the starting material and preferably to the feed thereof. The said part of the isomerization product which is to be subjected to fractional distillation may in this case suitably be recovered by separating constituents boiling lower than $C_n$-paraffins from the isomerization product.

It is frequently advantageous not to subject the top product produced from the starting material to isomerization immediately, but to subject it first to one or more purification processes (for example to remove sulfur compounds, water or such like). It is also possible to subject only part or a fraction of this top product, after optional purification, to isomerization, for example if it is desired to remove any components lighter or heavier than $C_n$ present therein. If desired, it is also possible to alter the $C_n$-isoparaffin content of the top product (for example by distillation or adsorption) before subjecting it to isomerization.

In the present embodiment the remainder of the isomerization product is subjected to distillation simultaneously with the starting material, as a result of which part of the isomerization product, consisting at least essentially of normal $C_n$-paraffins, finds its way into the top product to be subjected to isomerization and is thus itself also resubjected to this treatment. The heavier components of the isomerization product and those of the starting material are obtained during said distillation as one or more other fractions (usually only a bottom product).

The above procedure results in a considerable saving in both capital and operating costs over the known processes in which a starting material is separated so as to produce a material containing no or few isoparaffins, which is then subjected to an arbitrary isomerization treatment. This is particularly true in cases where the hydrocarbon material to be subjected to the present special isomerization treatment does not contain more than about 50% by weight of isoparaffins, based on the total content of paraffins with 4 or 5 carbon atoms per molecule. Particularly in the case of hydrocarbon materials that are still richer in isoparaffins, an added saving is obtained if (during the above-mentioned working up of both the starting material and the isomerization product with the aid of fractional distillation, at the same time recycling the bottom product of the latter distillation) heat present in the top product of the zone where the starting material is distilled is supplied to the zone where the isomerization product is distilled. This can conveniently be done by leading the top vapors of a column, in which the former distillation is taking place, through a reboiler of a column in which the latter distillation is taking place. During this process these vapors can be condensed in whole or in part, thus enabling reflux for the column in question to be prepared at the same time. For this reflux preparation or the heating of the other column, as the case may be, it is, of course, also possible, if required, to supply cold or heat from another source.

In principle a wide range of $C_n$-paraffin-containing materials, for example crude oil, cracking products or fractions thereof, can be used as starting materials for the present process. A very suitable material is a straight-run gasoline or gasoline fraction. For the preparation of essentially $C_5$-isoparaffins a stabilized gasoline may conveniently be utilized, although unstabilized, $C_4$-hydrocarbon-containing gasolines are also serviceable. In the latter case, either simultaneously with or following the removal of hydrocarbons with more than 5 carbon atoms per molecule, those with 4 carbon atoms per molecule should also at least substantially be removed. For the preparation of $C_4$-isoparaffins it is also possible to utilize an unstabilized gasoline, from which the material in question to be isomerized is prepared by removing therefrom at least substantially completely components heavier than $C_4$.

A possible example of a special isomerization treatment suitable for use in the process according to the present invention is a process carried out with the aid of an aluminum chloride-containing catalyst on a carrier containing platinum, aluminum and halogen, as disclosed, for example, in British patent specification No. 844,837, with which it is possible to obtain the high isoparaffin concentration required in the isomerization product.

Preferably, however, use is made of an isomerization treatment whereby the material to be subjected thereto is introduced in the liquid phase into the lower part of a reaction zone in which there is a column at least about 6 meters high of a molten catalyst mixture (catalyst column) containing aluminum chloride and antimony trichloride, the superficial velocity of which said material is introduced being about 0.3–3.0 meters per minute and isomerization product is extracted from the upper part, preferably from the top of the reaction zone. (By "superficial velocity" is meant the linear velocity at which the material in question would flow through this zone if it contained only this material.) Such an isomerization process can easily yield an isomerization product with a $C_n$-isoparaffin content (based on the total $C_n$-paraffin content) or more than 70%, and sometimes even of 75% as against isomerization treatments which make use of a stirred reactor.

The catalyst mixtures to be utilized in this preferred embodiment of the process according to the invention have a high specific gravity, approximately 2.5–3, and at isomerization temperature (which is preferably below approximately 110° C. and most advantageously between about 68° C. and about 95° C.), a low viscosity, i.e. about 7 centipoises; they possess high catalytic activity. In the isomerization treatment in question there is in the reactor an emulsion of hydrocarbons in a continous catalyst phase. The pressure in the reactor should be at least so high that the hydrocarbons are in the liquid state, and may, for example, even be about 8.5–35 atm. gauge. Under the influence of the force of gravity the hydrocarbons rise through the catalyst column. Preferably, the catalyst mixture contains 10–50% by volume and most advantageously 20–40% by volume of dispersed reaction mixture. The emulsion contains this reaction mixture conveniently in the form of fairly small drops, e.g. with a diameter of 0.25–6.4 mm. This drop size can easily be obtained by supplying the material to be isomerized at a rate of about 2.5–6 m./sec. through the inlet opening(s) to the reaction zone. The drop size will in that case be completely or substantially independent of the size of the outlet openings.

The height of the catalyst column, which should be at least 6 m., need not usually be more than about 15 m. Conveniently, the top end of the column is situated about 1 m. below the top of the reaction zone, where isomerization product is usually removed. Conveniently, the diameter of the catalyst column (and hence as a rule also of the reaction zone containing same) is about 0.3–1 m. The ratio between the length and the diameter of the catalyst column is preferably at least 10:1.

Since some sludge formation may occur under reaction conditions resulting in loss of aluminum chloride in the sludge, it is advisable to renew the catalyst mixture.

Preferably, this is done by extracting, continuously or intermittently, catalyst mixture from the upper part of the reaction zone at a point below the discharge for isomerization product, most advantageously at an average rate of 3–10% per hour of the quantity present (which is usually equivalent to about 0.008–0.025 part by volume of catalyst mixture per part by volume of hydrocarbon material led to the reaction zone per hour) and by supplying fresh and/or regenerated catalyst mixture to the bottom part, preferably at the bottom, of the catalyst column. In the case of isomerization of $C_4$-isoparaffins the amount of catalyst mixture to be extracted may conveniently be somewhat smaller (e.g. may have one of the lesser values within the said range) than in the case of $C_5$-paraffins (for which a higher value within this range may conveniently be selected). In this way the upper part of the reaction zone, above the catalyst discharge, can act as a settling zone in which the hydrocarbons separate off from the emulsion with the catalyst mixture; the coalesced reaction mixture is thus in this instance extracted from the top, and the catalyst mixture largely freed of reaction mixture from the bottom of this settling zone. Conveniently, the height of the settling zone is about $\frac{1}{3}$–$\frac{1}{4}$ of that of the reaction zone proper (catalyst column and settling zone together).

The catalyst may be regenerated, for example by contacting a quantity to be regenerated with the material to be subjected to the isomerization treatment. The sludge formed (essentially a complex of aluminum chloride with hydrocarbons) separates off and can be removed. The amount of aluminum chloride in the catalyst mixture can then be made up by contacting a quantity (the same or another) of the mixture with aluminum chloride, which raises the concentration of the latter in the mixture.

It is often advisable to conduct an isomerization treatment of the present type in the presence of a hydrogen halide, such as hydrogen chloride, preferably in quantities of about 4–8% by weight of the material to be subjected to the isomerization treatment. This halide may, for example, be introduced with the material to be subjected to the treatment in question, and removed with the isomerization product. It may then, if desired, be separated from this product and, if required, re-used in whole or in part with or without fresh halide. In such a case it is also sometimes possible to use larger quantities, even up to 25% by weight. If no recycle of this type is required, the use of smaller quantities, for example, of from 0.3% to 5%, is recommended. The correct amount should be determined in relation to the nature of the material introduced, the composition of the catalyst mixture and operating conditions.

It is also often advisable to conduct this isomerization treatment in the presence of a substance capable of suppressing cracking and other undesirable side reactions. If this substance is not already present in the material to be isomerized, it may, for example, be added thereto and the material together with the said substance passed to the isomerization zone. Apart from the naphthenes mentioned above, or also, for example, benzene, hydrogen or hydrogen-containing gas may very conveniently be used as such a substance. Preferably, especially in the case of the prepaartion of $C_5$-isoparaffins, the process is carried out at a partial hydrogen pressure of 0.08–33 atm.

The correct composition of the catalyst mixture depends on the composition of the material to be subjected to the present isomerization treatment; for the isomerization of $C_4$-hydrocarbons a composition with about 84–96% by weight of $SbCl_3$ and for that of $C_5$-hydrocarbons one with about 95–99% by weight of $SbCl_3$ (the remainder in both cases being $AlCl_3$) are recommended. The other reaction conditions may also often be somewhat less drastic in the case of $C_5$-isomerization than in that of $C_4$-isomerization.

Hereafter the invention is further illustrated by reference to the drawing, in which auxiliary apparatus, such as pumps, compressors, valves, etc., is in general not shown.

FIGURE 1 is a diagram of a preferred embodiment of the process according to the invention for the preparation of a hydrocarbon product, very rich in isoparaffins, from a light, straight-run petroleum gasoline fraction; a description is given of the preparation of a product rich in $C_5$-isoparaffins, but such a process is equally suitable for the preparation of a product rich in $C_4$-isoparaffins.

The gasoline fraction (ASTM boiling range about 37° C.–100° C.) containing $C_5$-paraffins consisting about 34% of isoparaffins is introduced via a line 1 into a distillation column 2, to which heat is supplied by means of a reboiler 3. In this column 2, which operates at a pressure of about 7 atm. abs., a bottom temperature of about 163° C. and a top temperature of about 106° C., the fraction is separated into top vapors consisting at least substantially entirely of $C_5$-paraffins and a bottom product containing the other components of the fraction. The top vapors are led via a line 4 through a reboiler 5, which supplies heat for a column 6. (If desired, additional heat can be extracted from the top vapors, for example by means of cooling water.) Condensation of the said vapors occurs; the resultant condensate is led to a side compartment 7 of a collecting vessel, removed therefrom via a line 8 and subsequently partly returned as recycle to the column 2 and partly (for reasons to be stated later) passed via a by-pass line 9 to a main compartment 10 of the collector. The liquid collecting in the main compartment 10 is led via a line 11, a sulfur-removal and drying treatment stage 12 and a line 13 to a zone 14 in which it is subjected to an isomerization treatment. In addition to the isomerization reactor proper this zone 14 may also contain additional apparatus, such as columns, separators, etc., as will be outlined later. The isomerization treatment in the zone 14 is such that the isomerization product extracted from this zone contains at least 60% by weight of isopentane, on the basis of the total $C_5$-paraffin content. This isomerization product, possibly after being subjected to a caustic lye and drying treatment (not shown), is led via a line 15 to the column 6, which operates at a pressure of about 3 atm. abs., a top temperature of about 55° C. and a bottom temperature of about 73° C. Reflux for the column 6 is formed with the aid of a cooler 16; a small (possibly slightly variable) amount of additional heat is supplied via another reboiler (steam-operated) 17. In this column 6 the isomerization product is separated into a top product removed via a line 18, consisting of 95% isopentane, and into a bottom product containing non-converted $C_5$ and heavier components, some being formed as by-product. This bottom product is recirculated via a line 19 to the column 2, in the case illustrated in the diagram to the feed thereto; it is also possible, if desired, to introduce the recycle separately into this column, optionally at approximately the same height as the feed.

Since the columns 2 and 6 are very intimately connected with each other (i.e. not only via the streams of material in the lines 4, 11, 13 and 15 on the one hand, and 19 on the other, but also via the heat flow in the reboiler 5, any disturbance occurring in the first column 2 (for example as a result of any change in feed composition or in one or more of the prevailing pressures and temperatures) will have an immediate effect on the operation of the second column 6, which may result in undesirable fluctuations in the composition of the isoparaffinic top product prepared there. For this reason the supply of heat to the column 6 is controlled so as to neutralize such an effect as far as possible. To this end, in the first place very careful attention is paid to ensuring that the quantity of bottom product from this column 6 that is led through the reboiler 5 per unit of time, there is always a constant quantity of condensate being extracted from the reboiler 5. If the amount of vapor supplied via the line 4 varies, resulting in a change in the amount of condensate formed, there will be a consequent change in the level of the condensate in this reboiler and hence also in the condensing surface; by this means the formation of condensate is rapidly restored to its original proportions. Since this method results in the formation of a fixed quantity of condensate per unit of time, the amount of heat liberated by the condensation process also remains the same and consequently so does the amount of heat transferred in the reboiler 5 to the (constant) partial stream of bottom product from the column 6. Pressure variations in the reboiler 5, which may occur because a constant amount of condensate is now being formed from a variable amount of vapor (supplied via the line 4), follow this line 4 back to the column 2 where they can be simply rectified, for example by altering the amount of heat supplied to this column by the reboiler 3. Owing to the constant nature of the condensate stream from the reboiler 5 the amount of liquid per unit of time discharged via the line 8 from the side compartment 7 is also constant; the variable reflux requirements of the column 2 are compensated by variations in the liquid stream lead via the by-pass line 9 to the main compartment 10 and thence on to the treatment and isomerization zones 12 and 14.

Figure 2:
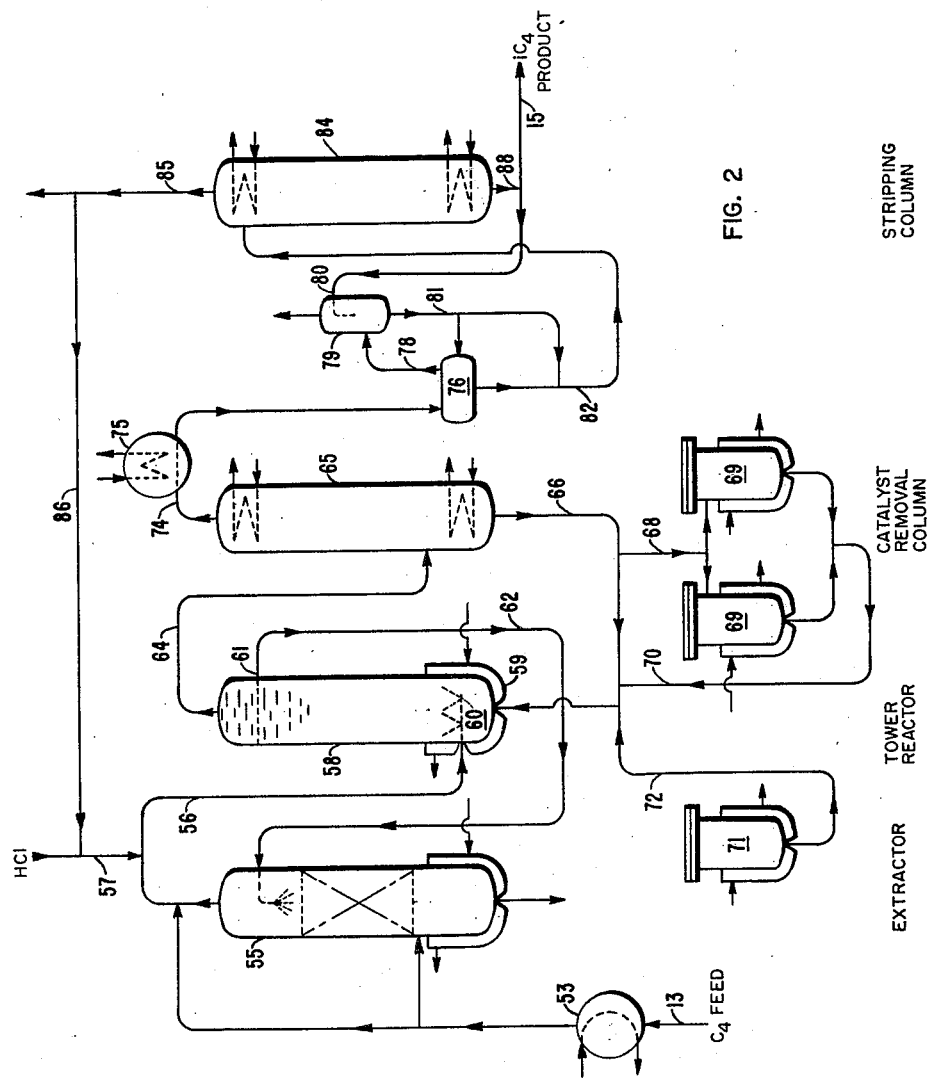

FIGURE 2 shows a diagram of a particularly convenient embodiment of the isomerization zone 14 that comprises an isomerization stage in which a column of catalyst mixture consisting of aluminum chloride and antimony trichloride is employed; this embodiment is described by reference to the isomerization treatment of material (hereinafter to be called butane) consisting at least substantially of $C_4$-paraffins. A quantity thereof, produced from any suitable starting material, is led through the line 13 via a heater 53 to an extraction column 55 where it is contacted in the liquid phase with a quantity of catalyst mixture supplied, in a manner to be described hereafter, from an isomerization reactor 58. Liquid butane containing extracted catalyst components is led from the extraction column 55 via a line 56 and an inlet pipe, in this case of about 0.25 m. diameter and provided with 10 holes with a diameter of about 5 mm., into the isomerization reactor 58 which is vertical and in this case consists of a pipe about 11 m. high and about 0.3 m. in diameter, so that the length diameter ratio thereof is approximately 37:1. Very conveniently, however, a simple pipe with one opening of, for example, about 16 mm. diameter may also be employed for the introduction of the butane. The lowest part of the reactor 58 is provided with a heating jacket 59; if desired, an alternative method may be used for supplying heat to the reactor 58. The butane to be subjected to the isomerization treatment is injected via a line 56 and a distributor device 60 into the reactor 58 at a superficial velocity of about 0.75 m. per minute. A molten catalyst mixture containing 93% by weight of antimony trichloride and 7% by weight of aluminum chloride is passed via a line 66 to the bottom of the reactor 58. Based on the amount of catalyst the liquid hourly space velocity of the butane in this case is about 7 parts by volume per part by volume of catalyst mixture per hour, which represents a contact time of about 8.6 min.

Most of this reactor, from the point at which the feed is injected up to and past a draw-off point 61, is filled with an emulsion of reaction mixture in molten catalyst mixture; the reaction mixture rises in the form of small drops through the catalyst mixture, the catalyst forming the continuous phase. With the butane being supplied at the rate mentioned the total volume of the emulsion is approximately 1.4 times that of the catalyst mixture present therein alone; the upper extremity of the catalyst column is situated some 9 m. above the feed injection point.

The temperature in the reaction zone is sufficiently high to render the catalyst mixture liquid, but in general need not be higher than about 100° C.; in the case illustrated it is about 85° C. The pressure in the reactor is high enough to keep the reaction mixture in the liquid phase; in the present case it is about 21 atm. gauge. In the case illustrated the isomerization treatment is conducted in the presence of hydrogen chloride which, after being supplied via a line 57, is introduced into the reactor 58 in combination with the feed. In the present case the amount of hydrogen chloride introduced is about 6% by weight, based on the amount of butane introduced via the line 13. If desired, a small quantity of hydrogen may be introduced, either with the hydrogen chloride or otherwise, in order to check undesirable side reactions.

A small quantity of liquid catalyst is extracted, continuously in the present case, from the reactor at the draw-off point 61, led via a line 62 to the upper part of the extraction column 55 and there passed countercurrent to the butane flowing upward. Catalyst components are dissolved in the butane stream and led in combination with this stream to the reactor 58. Another portion of the catalyst, with decreased activity, does not dissolve, separates off as a heavy residue and is drawn off from the bottom of the extraction column 55. This residue consists essentially of a hydrocarbon-AlCl$_3$ complex. The temperature of the butane led to the extraction column, which is generally dependent (suitable temperature being between 50° C. and 125° C., and preferably between 50° C. and 100° C.) is 77° C. in the present case. The pressure in the extraction column 55 is adjusted such that the butane flowing through the column may either remain in the liquid phase, or may be either partially or wholly vaporized.

The rate at which the catalyst is led from the reactor 58 to the column 55 depends in general on reaction conditions, but should in any case be such that no catatlyst sludge collects in the reactor 58. In the present case the amount drawn-off per hour is about 5% of the total amount of catalyst mixture present in the reactor, or, expressed in different terms, approximately 0.012 part by volume per part by volume of butane feed per hour.

The upper part of the reactor 58, above the draw-off point 61, forms a settling zone. The presence of this settling zone has the effect of restricting the amount of catalyst mixture entrained from the reactor in the product leaving the reactor via a line 64. For the removal of catalyst components (particularly antimony trichloride in solution), this product is led to a separating column 65, where hydrocarbons and HCl are separated off as a vapor fraction from a liquid fraction containing essentially catalyst components, chiefly SbCl$_3$. This liquid fraction is then led back via a line 66 to the reactor 58.

The activity of the catalyst in the reactor 58 is maintained by the addition of aluminum chloride. To this end, a quantity of the antimony trichloride stream may be led from the bottom of the column 65 via a line 68 into one of two heated vessels 69 containing solid aluminum chloride, where the liquid SbCl$_3$ is saturated with AlCl$_3$ and subsequently led back via a line 70 to the line 66 and the reactor 58. If desired, any make-up SbCl$_3$ required is pumped in the liquid state from a heated vessel 71 containing SbCl$_3$ via a line 72 to the line 66 and the reactor 58.

The vapor fraction from the separating column 65 escapes to a collector 76 via a line 74 in which a collector 76 via a line 74 in which a cooler 75 is positioned. In the cooler 75 the fraction is cooled in order to condense the hydrocarbons present.

The non-condensed material containing HCl, small quantities of inert gas formed in the system, and light hydrocarbons, is led (continouosly or intermittently) via a line 78 from the vessel 76 to the lower part of an absorption vessel 79, in which it is contacted with a suitable scrubbing medium (in this case insomerization product) led via a line 80 into the top of this absorption vessel, where HCl is absorbed by this medium. The vapors escaping from the top of the vessel 79, which are now essentially HCl-free, may be drawn out of the system; any valuable components still present therein, such as hydrogen, may be recovered and recycled to the reactor 58. The bottom fraction of the absorption vessel 79 contains HCl dissolved in isomerization product. This fraction is drawn off via a line 81 and may be recycled to the separator 76 or alternatively led to a line 82 which serves to draw off liquid from the separator 76 to an HCl stripping column 84. In this stripping column 84 an CHl-containing vapor is separated from a liquid fraction consisting essentially of the total isomerization product. The vapor fraction (which besides HCl may also contain some compounds formed in the process which besides HCl may also contain some compounds formed in the process which boil lower than butane) is pumped (if desired after removal of these compounds, for instance by means of distillation, not shown) via lines 85 and 86 to the line 57 and from there recycled to the reaction zone 58. The liquid fraction from the column 84 is drawn off via a line 88 from the bottom part of the stripping column 84. Part of this liquid is recycled via the line 80 to the HCl absorption vessel 79; most of it is drawn off as product via the line 15. If desired, this isomerization product may further be washed with a caustic lye solution to remove any acid components present. HCl may, if desired, be bled from the system, and make-up HCl added, for instance at the points shown.

The concentration of isobutane in the product drawn off via the line 15 (based on the total amount of C$_4$-paraffins present) is in this case about 67% by weight and may even on occasions be as high as 71% by weight. In this connection, it may be noted that when applying the same catalyst mixture in a conventional reactor with a stirring device, at a temperature of 80° C., a pressure of about 28 atm. gauge, a ratio catalyst to reaction mixture in the reactor of 1:1, with an average contact time of 13–15 minutes (i.e. much longer) and an amount of 4% by weight hydrogen chloride added to the butane feed, an average yield of only about 43% by weight of isobutane was obtained in 144 hours.

In addition to application within the scope of the preferred embodiment of the process according to the invention, as illustrated in FIGURE 1, the isomerization treatment illustrated in FIGURE 2, is, of course, also suitable for use in other embodiments of this process. If instead of butane pentane is isomerized, reaction conditions may, generally speaking, be somewhat less drastic; in this case the vapor fraction removed from the column 84 may contain also C$_4$-hydrocarbons formed in the process, which may (also) be removed before recycling of the HCl.

The considerable economic advantage obtained by applying the process according to the invention emerges clearly from the tables below. These show the capital, operating and total costs incurred in the preparation of a product (in quantities of about 470 tons per day) with an isopentane content of about 95% by weight (based on the total C$_5$-isoparaffin content) from a variety of starting materials, which themselves contain much less isopentane, by means of two embodiments of the process according to the invention. These costs were expressed as percentages of the corresponding costs incurred when use is made of a process in which the starting material is first to a considerable extent freed of isopentane (down to a content of about 5% by weight at the most) by distillation.

Use was made of an isomerization treatment as shown in FIGURE 2, whereby the product drawn off through the line 15 had an isopentane content of about 75% (based on the total amount of C$_5$-paraffins).

Table I shows the data obtained when applying an embodiment largely analogous to that illustrated in FIGURE 1, but in which the preparation of recycle for the column 2 and the reboiling of the column 6 were performed separately; in other words, in which the above-mentioned link between the two columns via the heat flow in the reboiler 5 was broken. The figures in the columns of the table indicate the isopentane contents (in percent by weight) of the various starting materials (based on the total $C_5$-paraffin content).

Table I

|  | 15% | 35% | 50% |
|---|---|---|---|
| Capital costs | 90 | 94 | 100 |
| Operating costs | 85 | 90 | 97 |
| Total costs | 87 | 92 | 98 |

Table I shows that, up to an isopentane-on-$C_5$ paraffin content in the starting material of about 50%, this embodiment of the process according to the invention is substantially cheaper than the known process, as regards both capital and operating costs. Since light, straight-run petroleum gasolines are normally employed as base material for isomerization processes and the isopentane content in question thereof is generally about 35%, the present embodiment is therefore much to be preferred to known processes for the treatment of ordinary isomerization feeds of this type.

The difference in cost between the known process and that according to the invention is further increased if use is made of an embodiment entirely in accordance with FIGURE 1, that is to say in which the preparation of reflux for the column 2 and the supply of heat for the column 6 are connected. The relevant data are given in Table II.

Table II

|  | 15% | 25% | 50% | 70% |
|---|---|---|---|---|
| Capital costs | 96 | 98 | 102 | 118 |
| Operating costs | 57 | 66 | 72 | 80 |
| Total Costs | 73 | 80 | 87 | 97 |

Table II shows that, although capital costs have risen slightly in comparison with those in Table I, this is more than offset by a very considerable drop in operating costs—to such an extent indeed that even when the isopentane content of the starting material is higher than 50%, a considerable advantage is still obtained over the known process.

I claim as my invention:

A process for the isomerization of a normal paraffinic hydrocarbon having 4 to 5 carbon atoms per molecule with a molten salt catalyst comprising aluminum chloride and antimony trichloride, which process comprises:

fractionally distilling a straight-run gasoline with a stream consisting of the higher boiling fraction of the reactor effluent described below to produce (A) a normal paraffin fraction having 4 to 5 carbon atoms per molecule and containing at least 15% by weight isoparaffin, and (B) a heavier residual fraction;

introducing fraction (A) in the liquid phase into the lower portion of a column of the catalyst at least 6 meters deep at a temperature from about 68 to about 95° C. and a pressure of about 8.5 to about 35 atmospheres and at a rate such that the fraction passes through the column at a superficial velocity of from about 0.3 to about 3 meters per minute;

withdrawing reactor effluent containing at least 60% by weight isoparaffin;

separating the effluent into an isoparaffin fraction and a higher-boiling fraction; and returning at least part of the higher-boiling fraction to the fractional distillation step above to be fractionated with the straight-run gasoline.

References Cited by the Examiner
UNITED STATES PATENTS 2,387,868  10/45  Anderson et al. _____ 260—683.75
2,983,775   5/61  Thomas _____ 260—683.75

ALPHONSO D. SULLIVAN, *Primary Examiner.*